March 28, 1950

J. JOHNSON 2,502,046

WINDROW PICKUP MACHINE

Filed July 2, 1948

INVENTOR.
JOHN JOHNSON
BY
McMorrow, Berman & Davidson
ATTORNEYS

March 28, 1950  J. JOHNSON  2,502,046
WINDROW PICKUP MACHINE
Filed July 2, 1948  4 Sheets-Sheet 4
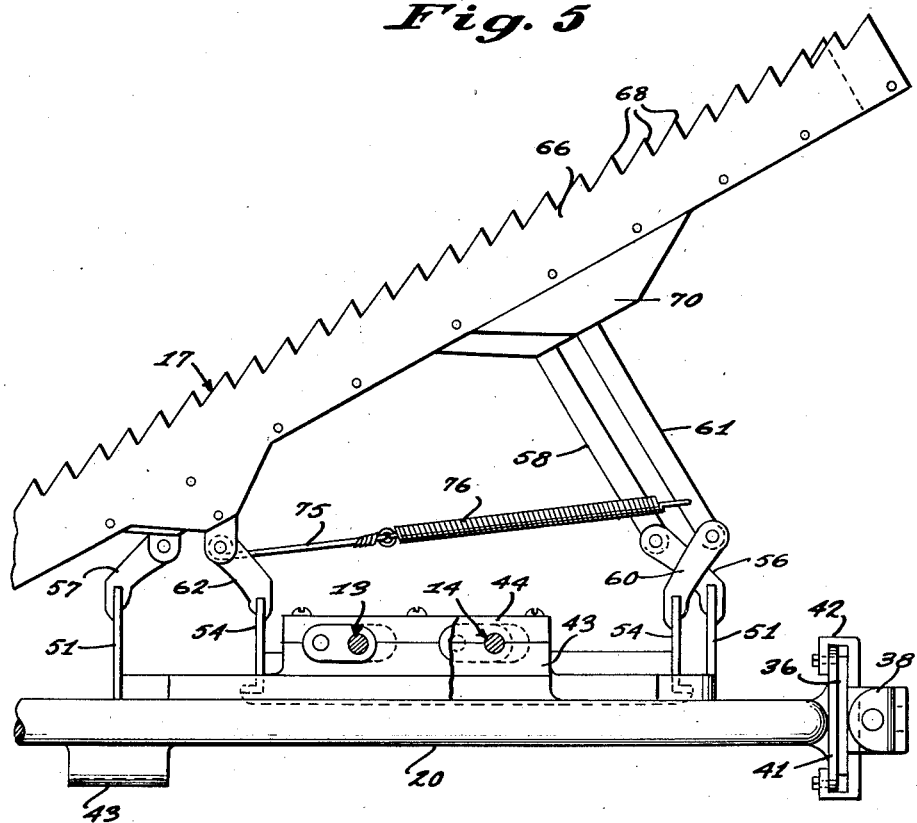
Fig. 5
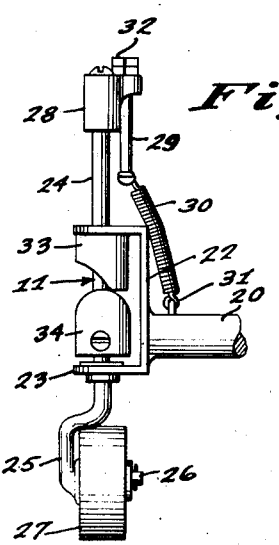
Fig. 6
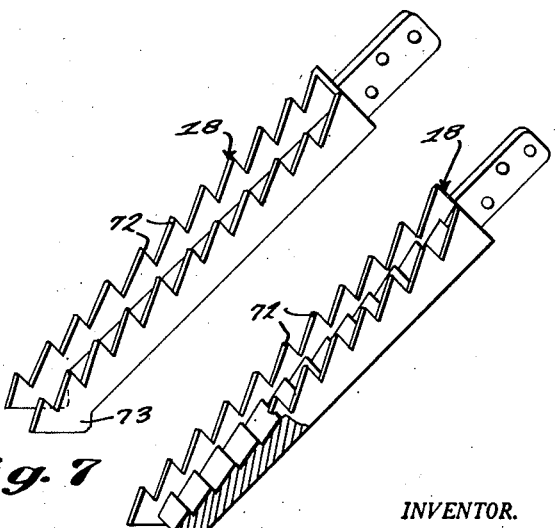
Fig. 7
Fig. 8
INVENTOR.
JOHN JOHNSON
BY
McMorrow, Berman + Davidson
ATTORNEYS Patented Mar. 28, 1950

2,502,046

UNITED STATES PATENT OFFICE 2,502,046

WINDROW PICKUP MACHINE

John Johnson, Brockton, Mont.

Application July 2, 1948, Serial No. 36,719

8 Claims. (Cl. 56—362)

1

This invention relates to improvements in pick-up machines and more particularly to an improved machine for picking up unthreshed grain or hay from windrows in a field and feeding such grain or hay to a combine, thresher or wagon.

While the improved pick-up machine can be used to pick up any type of material, which it is capable of handling, it is primarily designed for use as a windrow pick-up machine for a harvesting-threshing combination. It is conventional practice to cut or harvest and thresh grain simultaneously with a harvesting-thresher combine but under certain conditions it is necessary to first cut the grain and pile it in windrows to cure or dry before threshing. After the grain has been cut, raked into windrows and properly cured or dried a combine or threshing machine may then be pulled along the windrows by a suitable tractor to thresh out the grain. Under such conditions it is necessary to provide a suitable pick-up machine for lifting the unthreshed grain or straw from the windrow and depositing it on the table of the combine from which it is moved to the mechanism of the combine.

It is among the objects of the present invention to provide an improved pick-up machine which will pick up substantially all of the straw or hay in a windrow and move such hay or straw to a combine or wagon without beating the picked up material or shattering the grain or seed therefrom, which has little tendency to pick up rocks or similar objects and is effective to separate any such objects out of the hay or straw and return them to the ground before they can enter a combine or threshing machine where they would cause damage, which passes over ordinary obstructions, such as large rocks and stumps, and over uneven ground without interference and without skipping any important quantity of hay or straw, which will feed shattered grain to the combine or thresher and will pick up short or broken as well as the full length straw, which has no ground engaging teeth to be bent or broken by contact with obstructions, which may be easily attached to a conventional combine and connected to a tractor power take-off or other moving parts on the tractor or combine, and which is simple and durable in construction, economical to manufacture and easy to use.

Other objects and advantages will become apparent from a consideration of the following description and the appended claims in conjunction with the accompanying drawings, wherein:

Figure 5 is a side elevation on an enlarged scale of a fragmentary rear portion of the machine.

Figure 6 is a side elevation of a fragmentary portion of the machine showing in detail a machine supporting wheel assembly.

Figure 7 is a perspective view of a pick-up finger of the machine, and

Figure 8 is a perspective view similar to Figure 7 with a portion of the pick-up finger broken away and shown in cross-section to better illustrate the construction thereof.

Figure 1:
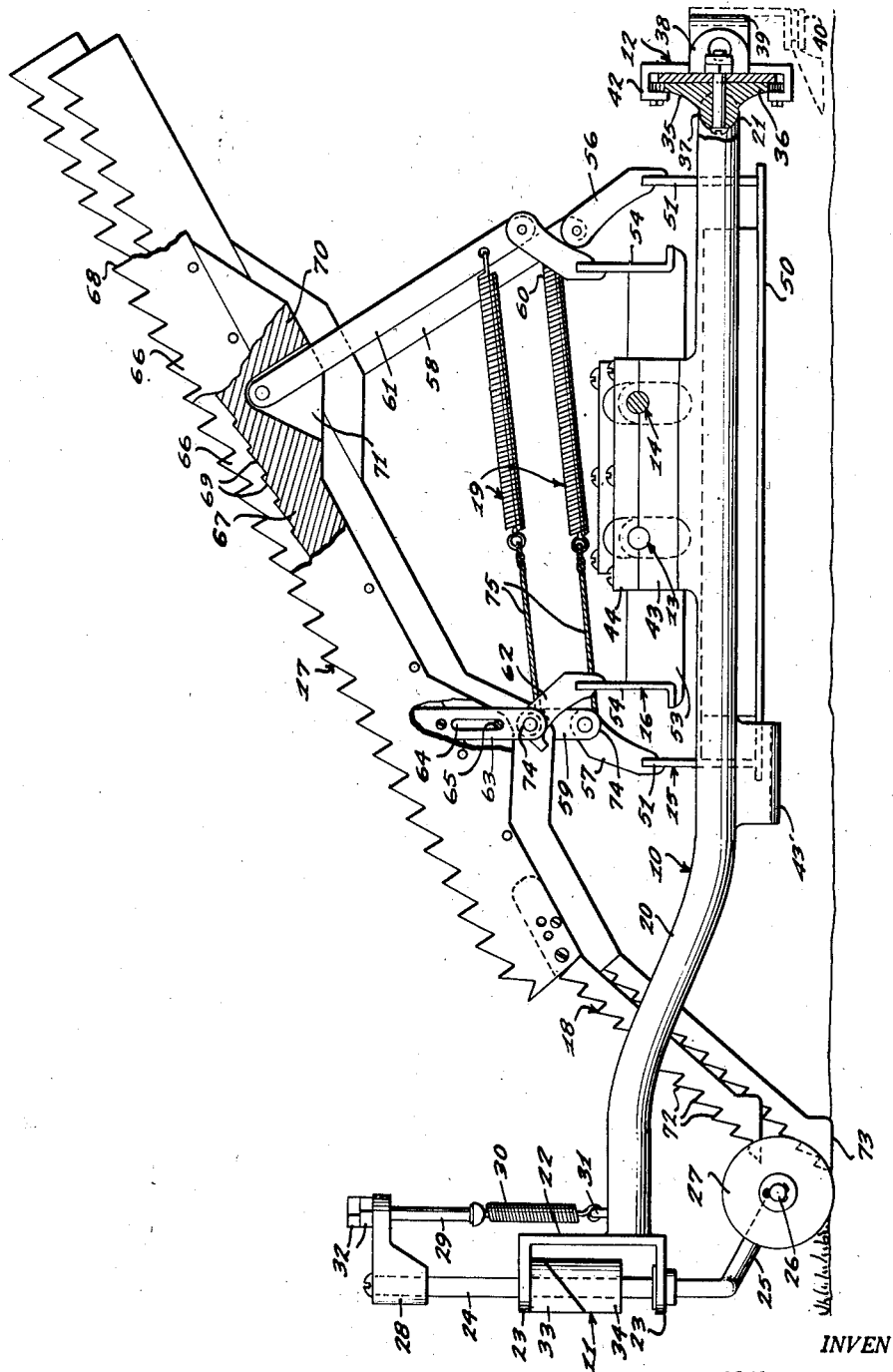
Figure 1 is a side elevation of a pick-up machine illustrative of the invention portions, being broken away and shown in cross-section, to better illustrate the construction thereof.
Figure 2:
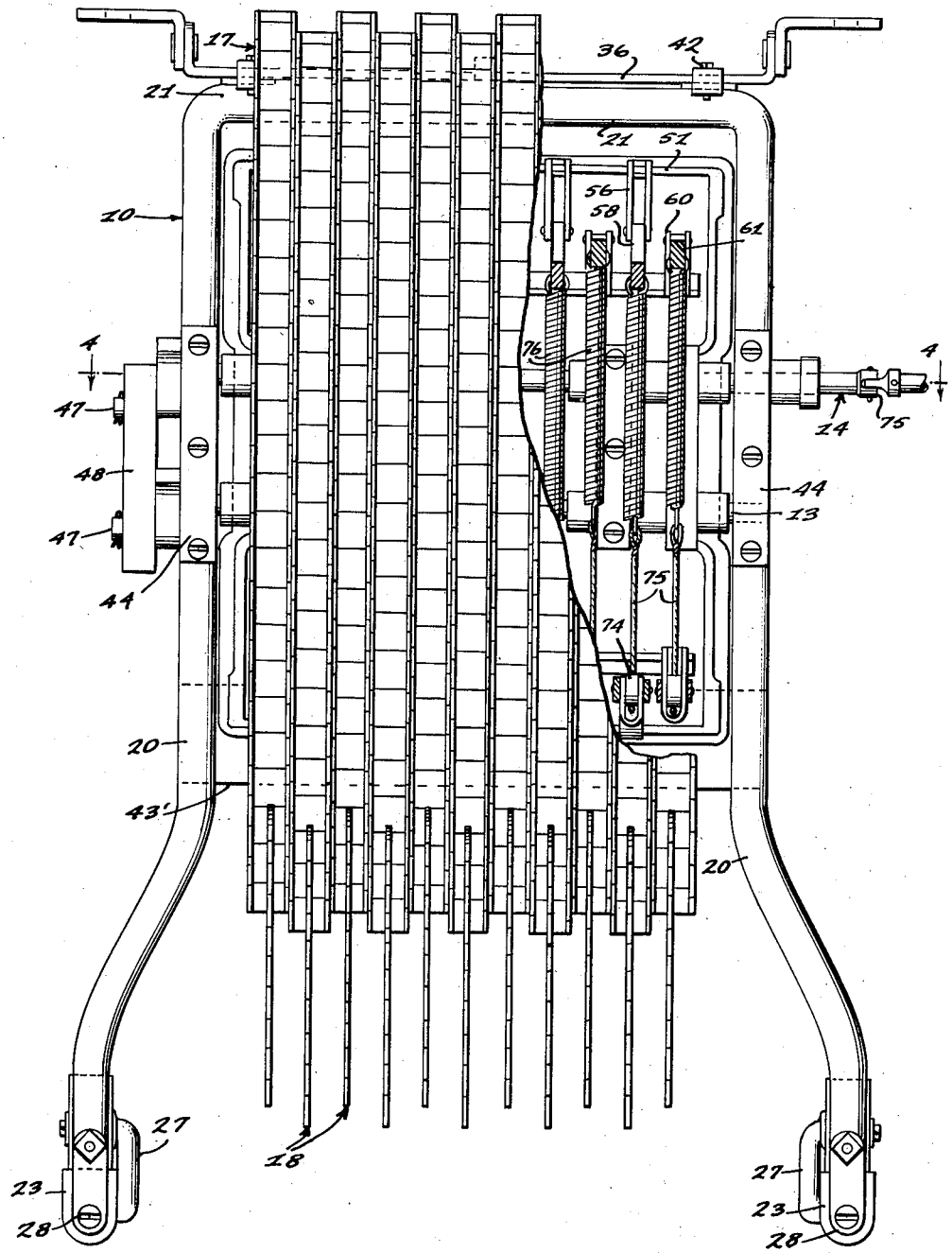
Figure 2 is a top plan view of the pick-up machine illustrated in Figure 1, portions being broken away and shown in cross-section to better illustrate the construction thereof.
Figure 3:
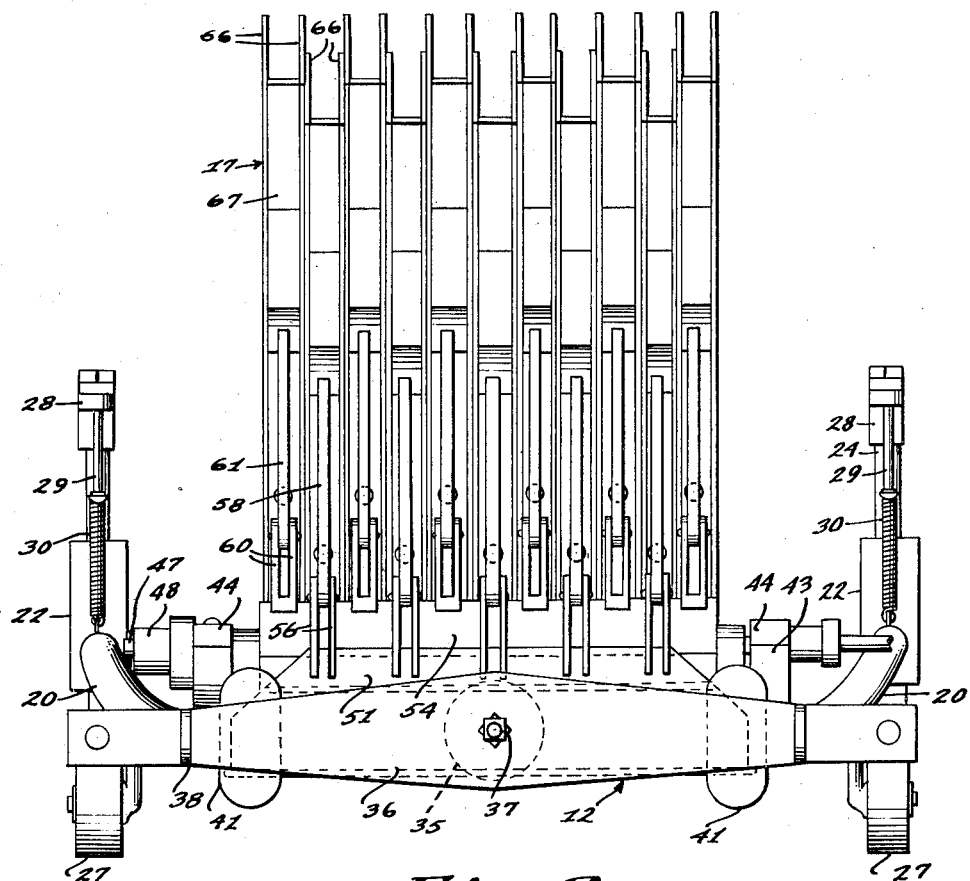
Figure 3 is a rear elevation of the improved pick-up machine.

With continued reference to the drawings, the improved pick-up machine comprises, in general, a U-shaped main frame 10 supported at its front end on a pair of caster wheel assemblies 11 and at its rear end by a pivoted hitch 12 adapted to be secured to the guard bar of the associated combine, a pair of crank shafts 13 and 14 journalled on the main frame, an outer sub-frame 15 and an inner sub-frame 16 mounted on the crank pins of said crank shafts, a plurality of straw walker bars 17 mounted on said sub-frames by suitable bracket and link assemblies. pick-up fingers 18 extending downwardly and forwardly from the front ends of the straw walker bars to engage the ground at the front end of the machine, and spring means 19 resiliently holding the pick-up fingers in ground-engaging position.

The main frame 10 is preferably a U-shaped tubular structure having legs 20 bent upwardly and forwardly near the front open end of the frame and having at its rear end a transverse bight portion 21.

Each of the wheel assemblies comprises a bracket 22 secured to the front end of the corresponding frame leg 20 and having a substantially vertical intermediate portion with apertured end portions 23 extending forwardly from the intermediate portion, a post 24 extending through and journalled in the apertures of the end portions 23 of the bracket with its upper end above the corresponding frame leg and its lower portion inclined downwardly and rearwardly to provide a wheel carrying arm 25 the end of which is perpendicularly extended to provide an axle 26 for the caster wheel 27, a bracket 28 secured to the upper end of the post 24 and having an outwardly extending apertured arm through which extends a threaded pin 29, the lower end of which is connected to the upper end of a tension spring 30, the lower end of which spring is connected by a suitable eye 31 to the front end of the frame leg. The bolt is adjustably secured to the bracket 28 by a nut and lock nut assembly 32 so that the tension on the spring can be varied to raise and lower the front end of the frame relative to the wheels 27. A cylindrical cam element 33 surrounds the post 24 with its upper end secured to the under side of the upper bracket portion 23, and its lower ends diagonally cut to cooperate with the diagonally cut upper end of a similar cam element 34 secured on the post 24 between the bracket end portion 23. With this arrangement when the machine is turned, the caster wheels will rotate the posts in the corresponding brackets 22 and the operatively associated cam elements 33 and 34 of each wheel assembly will raise the front end of the machine, as is clearly illustrated in Figure 6, to lift the lower ends of the pick-up fingers from the ground so that these fingers do not drag on the ground during the turning of the machine and will not be bent or broken by lateral forces imposed thereon.

The hitch assembly 12 comprises a pivot plate 35 secured to the rear side of the bight 21 of the frame substantially at the mid-length location of the latter, and a flat hitch bar 36 extending along the rear side of the frame bight substantially parallel to the latter. This hitch bar is pivotally secured to the frame by a pivot bolt 37 extending through the center of the pivot plate 35 and is provided at each end with a rearwardly extending apertured lug 38 which lugs are attached by means of suitable brackets 39 to the guard bar 40 of the harvester-thresher combine. A pair of substantially vertical plates 41 are secured to the frame bight, one near each end thereof, and a respective C clip 42 is secured to each plate 41 to overlie the corresponding end of the hitch bar 36 to hold the ends of the hitch bar to the main frame and minimize any strains in the hitch assembly during turning of the machine. The pivotal connection between the hitch bar and the main frame of the pick-up machine permits the combine and the pick-up machine to tilt or rock relative to each other as the two machines pass together over rough or uneven ground so that the attachment of the pick-up machine to the combine imposes no undue strain on either machine.

It will be noted that the main frame of the pick-up machine is re-inforced by a transverse or cross member 43' which extends between the legs 20 near the mid-length position of the latter and is bent downwardly so that it extends across the frame below the level of the frame legs and does not interfere with the operation of the machine.

Figure 4:
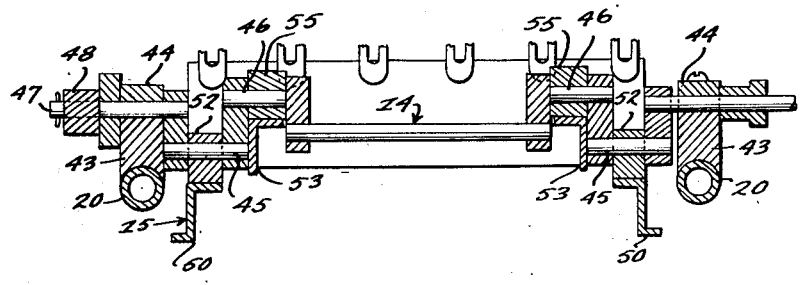
Figure 4 is a transverse cross-section of a fragmentary lower portion of the machine and is taken substantially on the line 4—4 of Figure 2.

The two spaced apart, substantially parallel crank shafts 13 and 14 are journalled near their opposite ends on pillow blocks 43 mounted on the main frame legs 20 intermediate the length of the latter, the two shafts being journalled one near each end of each pillow block and secured in operative position on the pillow blocks by corresponding bearing caps 44 secured to the tops of the pillow blocks. As the two crank shafts are substantially identical in construction, a detailed illustration and description of one is considered sufficient for the purposes of the present disclosure and the crank shaft 14 is shown in detail in Figure 4. This crank shaft has two sets of opposite throw cranks disposed one set adjacent each end of the shaft and directly at the inner sides of the corresponding pillow blocks 43. The outer cranks have crank pins 45 and the inner cranks have crank pins 46 disposed 180 degrees from the crank pins 45. An additional crank having a pin 47 is provided on one end of each crank shaft which pins 47 are disposed at an angle 90 degrees from the pins 45 and 46 and are connected together by a pitman 48 the purpose of these additional cranks being to avoid any dead center stopping of the two cranks and, together with the sub-frames 15 and 16 provide a continuous driving connection between the two crank shafts 13 and 14 when one of them is power driven.

The outer sub-frame 15 is a hollow rectangular structure having similar, parallel side walls 50 and end walls 51 substantially perpendicular to the side walls. This first or outer sub-frame is supported on the outer crank pins 45 of the two crank shafts by bearing blocks 52 secured to the side walls of the sub-frame so that when the two crank shafts rotate in the proper direction the sub-frame will move forwardly, upwardly, rearwardly and then downwardly.

The second or inner sub-frame 16 is also a hollow rectangular body having side walls 53 and end walls 54 and is journalled on the inner crank pins 46 of the two crank shafts by suitable bearing blocks 55 secured to the side walls of the inner sub-frame. The inner sub-frame thus has a movement similar to the movement of the outer sub-frame when the two crank shafts are rotated but displaced 180 degrees from the rotational phase of the outer sub-frame. The inner sub-frame 16 is shorter than the outer sub-frame 15 by an amount sufficient to provide free clearance between adjacent end walls of the two sub-frames as the sub-frames are revolved about the axes of the crankshafts 13 and 14.

A plurality of upstanding, forwardly-inclined brackets 56 are secured in substantially uniformly spaced-apart relation to the rear end wall of the outer sub-frame 15 and a plurality of similar, upstanding rearwardly-inclined brackets 57 are secured to the front end wall of this outer sub-frame. The brackets 56 and 57 are provided with apertures in their upper ends and respective links 58 are pivotally secured at their lower ends to the upper ends of brackets 56 while respective links 59 are pivotally secured at their lower ends to the upper ends of the brackets 57. The links 58 extend upwardly and are pivotally connected at their upper ends to alternative straw walker bars 17. Each front link 59 has in its upper portion an elongated slot and a respective pivot pin extends through each corresponding walker bar and through the slot in each link 59 to pivotally connect the walker bars to the links. Each walker bar is supported by two links carried by the same sub-frame and aligned forwardly and rearwardly with each other. The rear links 58 are longer than the front links 59 so that the walker bars are inclined rearwardly and upwardly, as is particularly illustrated in Figures 1 and 5.

Spaced apart, upstanding brackets 60 are secured to the rear end wall 54 of the inner or second sub-frame 16 in uniformly spaced apart relation and rear links 61 are pivotally connected at their lower ends to the apertured upper ends of these rear brackets and at their upper ends to corresponding walker bars 17 interposed between the walker bars supported by the bracket and link assemblies carried by the outer sub-frame 15. Brackets 62 extend upwardly and forwardly from the front end wall of the inner sub-frame 16 and front links 63 are pivotally connected at their lower ends to the apertured upper ends of respective brackets 62. Each front link 63 is provided near its upper end with an elongated, longitudinal extending slot 64 and a respective pivot pin 65 extends through the corresponding walker bar and the slot in the link to pivotally secure the walker bar to the link. The slots and pins of the front links 59 are similar to the slots 64 and pin 65 of the front links 63 and the pivot pins normally rest in the bottom ends of the slots.

Each of the walker bars 17 comprises a member of channel-shaped cross-section having a pair of spaced apart, substantially parallel side walls 66 and a bottom wall 67. The side walls 66 are provided along their upper edges with rearwardly directed serrations 68 and the bottom wall 67 is provided in its upper surface with rearwardly directed notches 69. The bottom wall 67 may be formed of thick material and have downward extensions 70 where the rear links 51 and 58 are connected thereto, these extensions being recessed, as indicated at 71, to provide for pivotal movement of the links relative to the walker bars. A similar construction may be provided for the attachment of the front links 59 and 53 to the corresponding straw walker bars.

The pick-up fingers 18 are secured at their upper ends one of the front end of each walker bar 17 and inclined downwardly and forwardly until their front ends are in engagement with the ground whenever the corresponding walker bars are moved to their forward and downward position by the crank shafts 13 and 14. These pick-up fingers 18 may comprise flat bars having end portions riveted or otherwise secured to the sidewalls of the corresponding straw walker bars and rearwardly directed serrations 72 on their upper edges or may, if designed, comprise members of channel shape having substantially parallel side walls with serrated upper edges. Each pick-up finger is provided at its forward or bottom end with a ground engaging foot formation 73 which has a substantially straight lower edge which inclines upwardly when the lower end of the pick-up finger strikes an obstruction so that the finger will pass easily over any ordinary obstruction.

A respective cable sheave 74 is mounted on the upper end of each forward bracket 57 and 62 and a respective cable 75 passes under each sheave 74 and has one end connected to the pivot pin of the corresponding walker bar 17. A respective coiled tension spring 19 is secured at one end to the opposite end of the cable and at its opposite end to the associated rear link 58 or 61 to resiliently urge the forward end of the walker bars downwardly with the pins 65 at the bottoms of the corresponding slots 64.

With this arrangement, when the front end of one of the pick-up fingers 18 strikes an obstruction or a sudden rise in the ground, it may raise, lifting the front end of the corresponding walker bar and pulling the corresponding cable 75 around the sheave 74 at the same time stretching the spring 76. After the obstruction or rise in the ground is passed, the spring returns the front end of the walker bar to its normal position. The pick-up fingers and the walker bars may move rearwardly against the tension of the corresponding springs 76 as well as upwardly, to avoid any shock to the mechanism. As the spring returns the walker bar and finger from a lifted and rearward position to its normal operative position the corresponding rear link 58 or 61 contacts the rear edge of the link receiving recess 71 and this provides a positive stop for forward movement of the walker bar and pick-up finger.

In the operation of the mechanism, while alternate walker bars and associated pick-up fingers are moved upwardly and rearwardly, the walker bars and pick-up fingers between each two of such alternate bars and fingers are moving downwardly and forwardly so that the straw is continuously walked up the pick-up fingers and the walker bars, the sharp rearwardly directed teeth or serrations 68 and 72 continuously moving the straw or hay upwardly and rearwardly over the pick-up mechanism and dropping it at the rear end of the machine onto the platform of the combine or into the bed or frame of a suitable wagon or other vehicle.

The crank shaft 14 is provided on its end adjacent the tractor with a suitable power coupling including a universal joint 75 so that the pick-up machine can be easily connected to the power take-off of a tractor used to propel the machine and the combine or other pick-up supporting vehicle, or to some other convenient rotatable part on the tractor or combine.

As the straw is moved upwardly by the pick-up fingers most of the stones and other objects will be shaken or winnowed out of it and fall to the ground and the remaining foreign objects will fall out as the straw passes up over the walker bars 17. Notches 69 in the bottom walls of the walker bars will not prevent such objects from running down the walker bars to the ground but will move any shattered grain falling out of the straw upwardly and rearwardly as the straw is moved upwardly and rearwardly of the machine.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A windrow pick-up machine comprising a U-shaped main frame having an open front end, a hitch bar pivotally secured to the rear end of said main frame and adapted to be secured to the guard bar of a harvesting and threshing combine, a pair of caster wheels secured on to the end of each leg of said main frame at the front end of the latter, a pair of spaced apart, substantially parallel crank shafts extending transversely across and journalled on said main frame, each of said crank shafts having two sets of opposite throw cranks disposed one set adjacent each leg of said main frame, a first substantially rectangular sub-frame journalled on the pins of corresponding cranks of both sets of both shafts so that said sub-frame moves forwardly, upwardly, rearwardly and downwardly as said shafts are rotated in the proper direction, a second substantially rectangular sub-frame journalled on the remaining crank pins of said crank shafts and having a movement similar to the movement of said first sub-frame but displaced one hundred eighty degrees therefrom, spaced apart brackets upstanding from the front and rear ends of both sub-frames, respective links pivotally connected at their lower ends to the upper ends of said brackets, the rear links being longer than the front links and each front link having an elongated slot in the upper portion thereof, a plurality of straw walker bars each pivotally connected near its rear end to the upper end of a respective rear link, a respective pivot pin secured to each walker bar and extending through the longitudinal slot in a respective front link, a cable sheave on each front bracket, a respective cable passing under each sheave and having one end attached to the associated walker bar, a respective tension spring connected at one end to the opposite end of each cable and at its opposite end to the corresponding rear link to resiliently urge the front ends of said walker bars downwardly, each walker bar being mounted on a front and rear link carried by the same sub-frame with alternate walker bars supported on said first and second sub-frames, and each walker bar comprising a member of U-shaped cross-section having spaced apart, substantially parallel side walls provided in their upper edges with rearwardly directed serrations and a bottom wall provided in its upper surface with rearwardly directed notches, respective pick-up fingers extending forwardly and downwardly from the front ends of said walker bars and having rearwardly directed serrations in their upper edges, and a driving connection on one end of one of said crank shafts.

2. A windrow pick-up machine comprising a main frame, a hitch bar secured to the rear end of said main frame for attaching said machine to a combine, a pair of spaced apart caster wheels secured to the front end of said frame to support the latter, cam means operatively connected between said caster wheels and said main frame to elevate the front end of the latter when said wheels are turned, a plurality of serrated straw walker bars supported on said main frame and inclined rearwardly and upwardly, a plurality of serrated pick-up fingers secured one to the front end of each walker bar and inclining forwardly and downwardly from the front ends of said walker bars, and power operated means carried by said main frame and operatively connected to said walker bars to impart straw elevating movements to said walker bars.

3. A windrow pick-up machine comprising a main frame, a hitch assembly secured to the rear end of said main frame for attaching the rear end of said machine to a supporting vehicle, a pair of spaced apart caster wheel assemblies secured to and supporting the front end of said main frame, a plurality of serrated straw walker bars disposed in side-by-side relationship above said main frame and extending rearwardly and upwardly from the front end to the rear end of the latter, a plurality of serrated pick-up fingers each secured at its upper end to the front end of a respective straw walker bar and inclined downwardly and forwardly therefrom, and power operated means carried by said main frame supporting said straw walker bars and imparting straw elevating movement thereto, each of said caster wheel assemblies comprising a bracket having a vertical intermediate portion secured to said main frame and apertured upper and lower end portions extending outwardly in the same direction from the corresponding ends of said intermediate portion substantially perpendicular thereto, a substantially vertical post journalled in the end portions of said bracket and including a downwardly and rearwardly inclined wheel arm below said bracket and a wheel axle at the end of said arm, a wheel journalled on said axle, a second bracket secured to the top end of said post and having an outwardly extending arm, a spring operatively connected between said bracket arm and said frame resiliently supporting said frame on said wheel carried post, an upper cylindrical cam surrounding said post and secured at its upper end to the under side of said bracket upper end portion, said cam having a lower end surface inclined relative to said post, and a lower cylindrical cam secured to said post immediately below said upper cam and having an inclined upper end surface in contact with the inclined lower end surface of said upper cam.

4. A windrow pick-up machine comprising a main frame, a hitch assembly secured to the rear end of said main frame for attaching the rear end of said machine to a supporting vehicle, a plurality of serrated straw walker bars disposed in side-by-side relationship above said main frame and extending rearwardly and upwardly from the front end to the rear end of the latter, a plurality of serrated pick-up fingers each of which is secured at its upper end to the front end of a respective straw walker bar and inclined downwardly and forwardly therefrom, and power operated means carried by said main frame supporting said straw walker bars and imparting straw elevating movement thereto, each of said straw walker bars comprising a channel-shaped member having upwardly directed side wall edges extending substantially the entire length thereof and provided with rearwardly directed serrations and a bottom wall having rearwardly directed notches in the upper surface thereof.

5. A windrow pick-up machine comprising a main frame, a hitch assembly secured to the rear end of said main frame for attaching the rear end of said machine to a supporting vehicle, a plurality of serrated straw walker bars disposed in side-by-side relationship above said main frame and extending rearwardly and upwardly from the front end to the rear end of the latter, a plurality of serrated pick-up fingers each of which is secured at its upper end to the front end of a respective straw walker bar and inclined downwardly and forwardly therefrom, and power operated means carried by said main frame supporting said straw walker bars and imparting straw elevating movement thereto, each of said straw walker bars comprising a channel-shaped member having upwardly directed side wall edges provided with rearwardly directed serrations and a bottom wall having rearwardly directed notches in the upper surface thereof and each of said pick-up fingers comprising a flat bar having a ground contacting foot at its forward end and an upwardly directed edge provided with serrations.

6. A windrow pick-up machine comprising a main frame, a hitch assembly secured to the rear end of said main frame for attaching the rear end of said machine to a supporting vehicle, a pair of spaced apart caster wheel assemblies secured to and supporting the front end of said main frame, a plurality of serrated straw walker bars disposed in side-by-side relationship above said main frame and extending rearwardly and upwardly from the front end to the rear end of the latter, a plurality of serrated pick-up fingers each secured at its upper end to the front end of a respective straw walker bar and inclined downwardly and forwardly therefrom, and power operated means carried by said main frame supporting said straw walker bars and imparting straw elevating movement thereto, said power operated means comprising a pair of parallel spaced apart crank shafts journalled on said main frame each having two sets of opposite throw cranks disposed one set near each end of each shaft, an outer sub-frame journalled on corresponding cranks for rotary movement upon rotation of said crank shafts, an inner sub-frame journalled on cranks disposed one hundred eighty degrees from the cranks supporting said outer sub-frame, each of said sub-frames having a front wall and a rear wall, rear brackets secured to and extending upwardly from each rear wall in spaced apart relationship therealong, rear links pivotally connecting alternate walker bars to the brackets carried by said outer sub-frame, rear links pivotally connecting the walker bars intermediate said alternate walker bars with the brackets carried by said inner sub-frame, front brackets secured to and extending upwardly from each sub-frame front wall, front links alternatively connecting said walker bars with said outer sub-frame carried and said inner sub-frame carried front brackets, a lost motion connection between each walker bar and the associated front link providing freedom of upward movement of the front ends of said walker bars and the attached pick-up fingers, and spring means resiliently resisting upward movement of the front ends of said walker bars.

7. A machine comprising a wheel supported frame, a plurality of straw walker bars disposed in side by side relationship above said frame, and means individually supporting said walker bars above said frame for cyclic movement of said bars relative to said frame, each of said straw walker bars comprising a channel shaped member having upwardly directed side walls spaced apart in substantially parallel relationship to each other and provided in their upper edges with serrations for moving straw longitudinally thereof and a bottom wall disposed between the lower edges of said side walls and provided with rearwardly directed notches in the upper surface thereof for moving seed longitudinally of the straw walker bar.

8. A machine comprising a wheel supported frame, a plurality of straw walker bars disposed in side by side relationship above said frame, and means individually supporting said walker bars above said frame for cyclic movement of said bars relative to said frame, each of said straw walker bars comprising a channel shaped member having upwardly directed side walls spaced apart in substantially parallel relationship to each other and provided in their upper edges with serrations for moving straw longitudinally thereof and a bottom wall disposed between the lower edges of said side walls and provided with rearwardly directed notches in the upper surface thereof for moving seed longitudinally of the straw walker bar, adjacent straw walker bars being contiguously disposed to substantially preclude the passage of seed between the straw walker bars.

JOHN JOHNSON.

REFERENCES CITED

The following references are of record in the file of this patent:

UNITED STATES PATENTS

| Number | Name | Date |
| --- | --- | --- |
| 1,260,059 | Rieke | Mar. 19, 1918 |
| 1,861,919 | Hill | June 7, 1932 |
| 2,095,949 | Altgelt | Oct. 19, 1937 |
| 2,271,304 | Mulholland | Jan. 27, 1942 |
| 2,282,506 | Wachter | May 12, 1942 |

FOREIGN PATENTS

| Number | Country | Date |
| --- | --- | --- |
| 199,941 | Great Britain | July 5, 1923 |
| 5,802 of 1932 | Australia | Feb. 2, 1933 |